United States Patent Office 2,945,224
Patented July 12, 1960

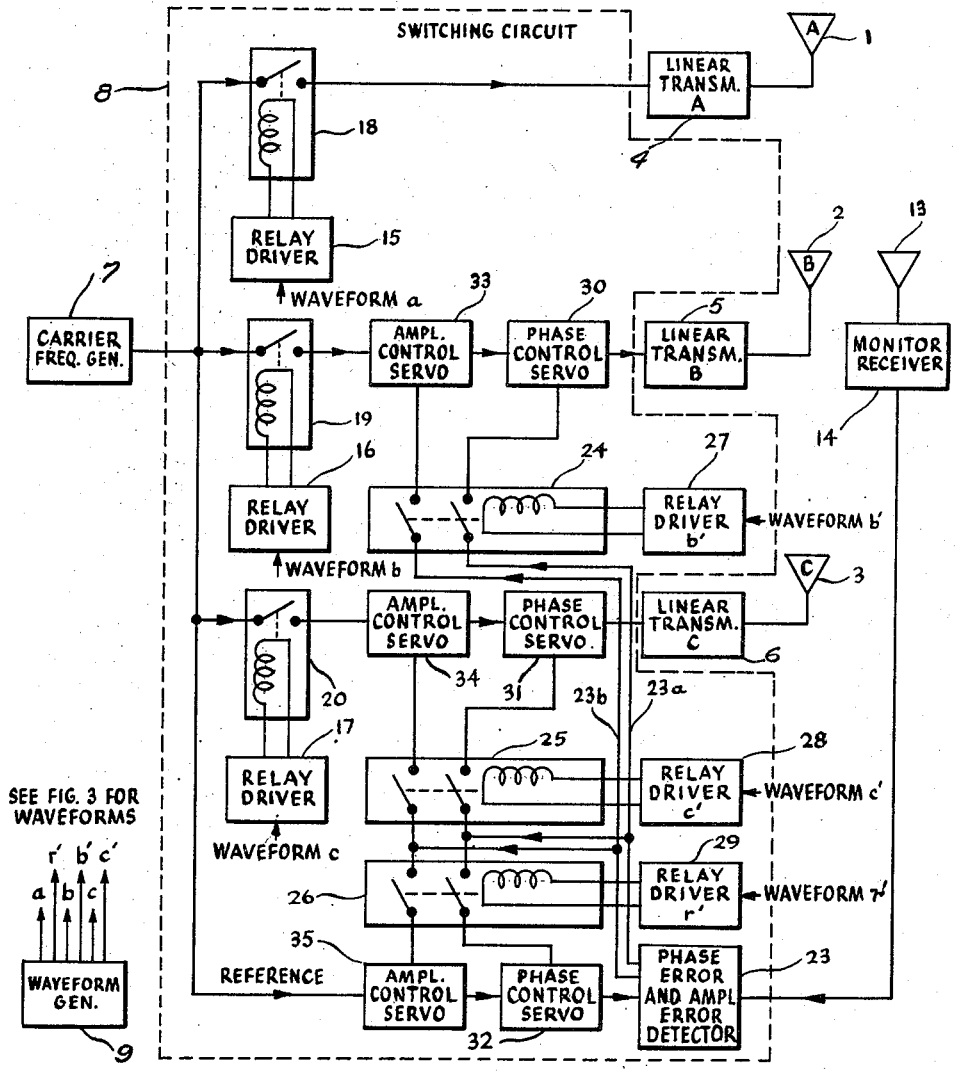

2,945,224

PHASE AND AMPLITUDE CORRECTION SYSTEM AND NAVAGLOBE BEACON UTILIZING SAME

Richard H. Myers, West Caldwell, N.J., assignor to International Telephone and Telegraph Corporation, Nutley, N.J., a corporation of Maryland Filed July 8, 1957, Ser. No. 670,431

8 Claims. (Cl. 343—102)

This invention relates to a correction system for bringing a plurality of electrical signals into phase and amplitude agreement and particularly relates to a radio beacon utilizing such a correction system.

In many systems it is necessary to bring a plurality of electrical signals into phase and amplitude agreement. One example of this is the system known as Navaglobe referred to in the copending application of M. Dishal et al., Serial No. 499,046, filed April 4, 1955, now Patent No. 2,861,177 issued November 18, 1959 for "Control System for Correcting Phase and Amplitude." In bringing a plurality of signals into agreement, it has been the practice to successively compare each signal with a reference and bring the signals successively into agreement therewith. In certain systems, however, this one-to-one comparison of a single signal and a reference introduces difficulties or undesirable features. For example, in the Navaglobe system three radiating antennas located at the corners of an equilateral triangle and separated a distance equal to less than one-half wavelength of the frequency radiated, are cyclically fed in pairs to cyclically produce three differently directed radiation patterns. An omnidirectional synchronizing signal is sent between such cycles on a separate frequency from one of the antennas. In a mobile craft using this beacon as a guide, the energy received according to each of these different patterns is compared, and a line of direction is obtained therefrom. For this bearing to be accurate it is essential that the signals radiated by the different antennas be closely controlled in amplitude and phase. Since the cyclical signals emitted by the antennas are emitted two at a time and can be detected only as the vector sum of two signals, it has been necessary to further interrupt the sequence of radiation in pairs to permit making the phase and amplitude correction by successive comparison with a reference on a one-to-one basis. These additional interruptions of the cyclical operation of the beacon are undesirable and further affect the complexity of equipment required at both the beacon and the mobile craft utilizing the beacon signals. Since during these additional interruptions the signal emitted for correction purposes is of the same frequency as the information signals during cyclic operation, if the receiver does not properly separate them from the information signals, the resulting bearing indication will be erroneous. This problem is avoided by the present invention, as will be seen hereinafter.

An object of the present invention is the provision of an improved correction system for bringing a plurality of signals into phase and amplitude agreement.

Another object of the present invention is the provision of such a correction system in which the signals are sensed in groups of two or more as the vector sum of the signals which compose each group.

A further object of the present invention is the provision of an improved radio beacon, particularly a "Navaglobe" beacon.

A still further object of the present invention is the provision of a correction system for monitoring and controlling the signals radiated by the antennas of a beacon, particularly a Navaglobe beacon.

In accordance with a main feature of this invention, the vector sum of predetermined groups of the total signals involved are compared with a reference signal in a planned order. Each time a comparison is made an error signal is produced which is applied to correct at least one of the signals in the comparison so that, for example, the error signal is nulled. In certain examples the reference signal itself is corrected during one of the comparisons. Upon completing a given number of comparisons and corrections, all the signals are made equal to each other.

In accordance with a further feature of the present invention, the signals in successive groups mentioned in the main feature vary according to a cyclical permutation scheme, and the number of signals in a group are relatively prime with respect to the total number of signals involved.

In accordance with another feature of this invention, there is provided a Navaglobe system in which the cyclical feeding of the antennas in pairs—and therefore the cyclical rotation of the antenna pattern—is uninterrupted except for the synchronizing signal, and corrections of the phase and amplitude are made in accordance with the main feature of this invention by successively taking the vector sum of the signals of each successive pair of actuated antennas (for example, by detecting the radiation from the antennas at a point equidistant from each) and comparing each vector sum with a reference signal while making suitable corrections.

Other and further objects of the present invention will become apparent, and the foregoing will be better understood with reference to the following description of embodiments thereof, reference being had to the drawings, in which:

Fig. 2 is a block diagram of the system of Fig. 1 showing in greater detail the switching circuit; and Fig. 3 is a waveform diagram and a chart of the sequence of steps used in describing the operation of the system of Fig. 2.

Figure 1:
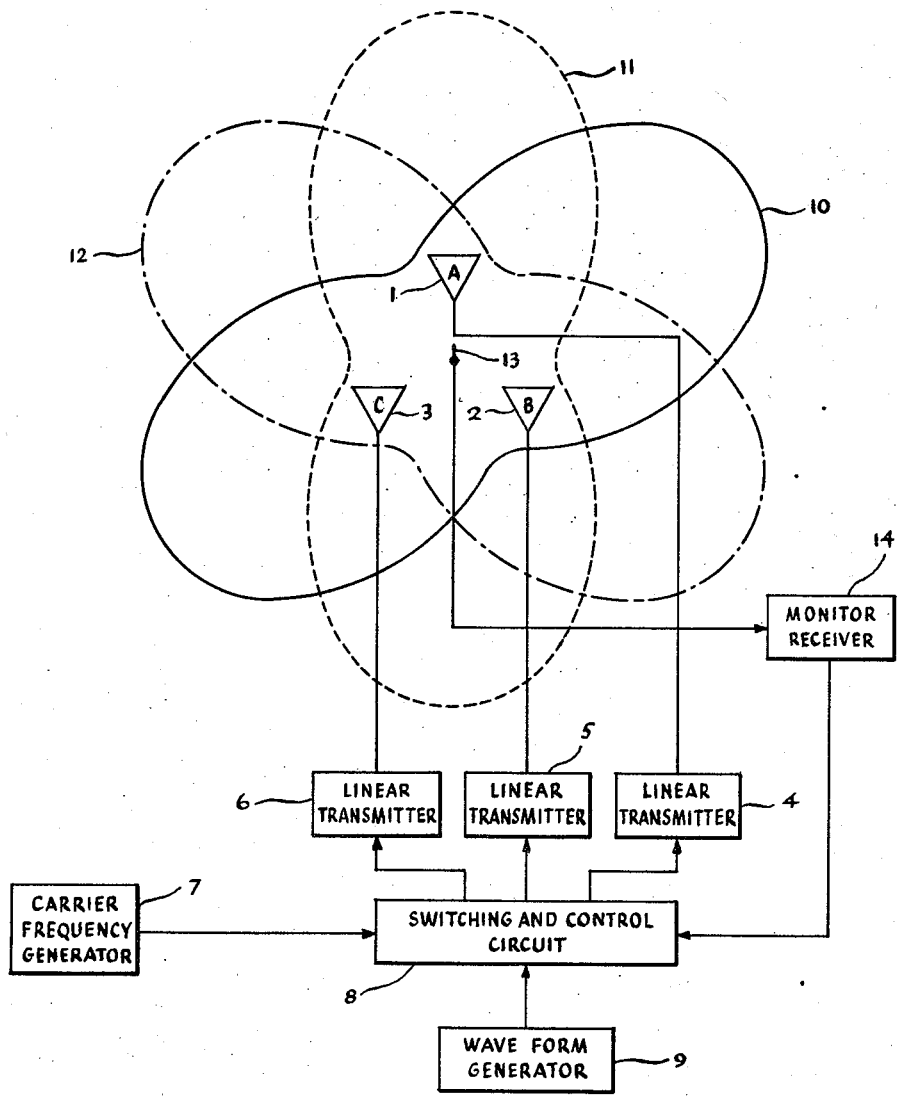
Fig. 1 is a schematic and block diagram of a Navaglobe beacon transmitter including the radiation patterns.

In carrying out the present invention, the vector sums of successive different groups of the total number of signals to be brought into phase and amplitude agreement are compared with a reference signal, and in each comparison at least one of the signals involved is corrected. (In certain instances this may be the reference signal itself.) While the reference signal can be substantially different in phase and amplitude from each of these vector sums, for simplicity in instrumentation and to avoid the large corrections, the reference signal is preferably close to the approximate phase and amplitude of the vector sum. Each of the groups preferably has the same number of signals therein, and each signal should appear in at least two groups. In many cases the members of the group vary according to cyclically permutative order. In such cyclical permutation schemes it is necessary that the number of signals in the group should be relatively prime with respect to the total number of signals involved. (The total number does not include the reference.) That is to say, there must not be a common integral denominator other than unity for the number of signals in a group and the total number of signals involved.

In the Navaglobe system the successive groups are varied according to a cyclical permutation scheme, and the number of signals in the group are relatively prime with respect to the total signals involved. This is clear if we consider that the Navaglobe system emits three signals, A, B and C, one from each of the antennas. These are emitted in pairs as follows: $A+B$, $B+C$, $C+A$, $A+B$, $B+C$, etc. It will be seen that the members of successive groups vary according to a cyclical permutation scheme. It will also be seen that of the total number of three signals the groups only consist of two at a time; and therefore, the number of signals per group and the total signals are relatively prime.

For example, consider five signals A, B, C, D and E, where the vector sums of groups of three of the signals can be detected, the successive groups varying in cyclically permutative order and it is desired to make all signals equal to signal A. The vector sum of signals in groups must be compared to a controlled reference signal R which is of the same frequency as A. The reference signal R is selected to have a magnitude approximately equal to 3A and is approximately in phase with signal A. While not absolutely required, this enables achieving the correction with only small adjustments of phase and amplitude instead of very large ones which would introduce problems of instrumentation. In vector notation this requirement may be stated as $\overline{R}=\overline{3A}+\overline{\Delta}$, where $\Delta$ represents a vectorial difference. The following groups are compared with the reference signal in the enumerated order and the indicated corrections of phase and amplitude of vector signals are made to bring signals B, C, D and E into equality with signal A.

Make $A+B+C=R$ by correcting $B$
Therefore $B=R-C-A$
Make $B+C+D=R$ by correcting $D$
Therefore $D=A$
For $C+D+E$ make no correction
Make $D+E+A=R$ by correcting $E$
Therefore $E=A+\Delta$
Make $E+A+B=R$ by correcting $B$
Therefore $B=A$ This ends the first cycle.

Make $A+B+C=R$ by correcting $C$
Therefore $C=A+\Delta$
For $B+C+D$ make no correction
Make $C+D+E=R$ by correcting $E$
Therefore $E=A$
Make $D+E+A=R$ by correcting $R$
Therefore $R=3A$
For $E+A+D$ make no correction This ends the second cycle.

Make $A+B+C=R$ by correcting $C$
Therefore $C=A$

Upon inspection it becomes clear that by treating the groups of three signals in cyclically permutative order and making the indicated corrections to bring the vector sum of the three signals in each group and the reference signal R into equality, the signals B, C, D and E are made equal to signal A.

Another general application of this invention similar to the above is where the problem is to bring four signals A, B, C and D into equality by making three of the signals equal to the fourth. For example, make signals B, C and D equal to signal A, where only the vector sum of the groups of three can be detected. Upon fixing the reference R in the same manner as described above so that $\overline{R}=\overline{3A}+\overline{\Delta}$, the following groups are compared and corrections made in order shown.

Make $A+B+C=R$ by correcting $B$
Therefore $B=R-A-C$
Make $B+C+D=R$ by correcting $D$
Therefore $D=A$
Make $C+D+A=R$ by correcting $C$
Therefore $C=A+\Delta$
Make $D+A+B=R$ by correcting $B$
Therefore $C=B=A+\Delta$ This ends the first cycle.

Make $A+B+C=R$ by correcting $C$
Therefore $C=A$
For $B+C+D$ make no correction
Make $C+D+A=R$ by correcting $R$
Therefore $R=3A$
Make $D+A+B=R$ by correcting $B$
Therefore $B=A$ This ends the second cycle.

Another feature of this invention is brought forth by application of the system to control radiation of the Navaglobe radio beacon shown in Fig. 1. The problem there is to maintain equality of the radiation from three antennas which radiate cophasally in pairs to produce a field which rotates in a stepped clockwise manner. For this application consider the system composed of three antennas A, B, and C, and suppose it is desired to make radiation from the antennas B and C equal to the radiation from antenna A. First establish a stable but yet controllable reference signal R of the same frequency as A and approximately equal in amplitude and phase to 2A so that $\overline{R}=\overline{2A}+\overline{\Delta}$. If the following four comparisons of vector sums (combined radiation of antennas of each group) with the reference signal are made and the indicated corrections are made at each comparison, radiation from antennas A, B and C will be brought into equality with radiation from antenna A.

Make $A+B=R$ by correcting $B$
Make $B+C=R$ by correcting $C$
Therefore $C=A$
Make $C+A=R$ by correcting $R$
Therefore $R=2A$ This ends the first cycle of the beacon.

Make $A+B=R$ by correcting $B$
Therefore $B=A$

Upon close examination of the above series of comparisons and corrections, it becomes clear that the three signals detected in pair in cyclically permutative order can be brought into equality in 1⅓ cycles of the rotating field of the beacon. Since it is the object of the Navaglobe system to create this rotating beacon by radiating from the three antennas cophasally in pairs, we see that the above described comparisons and corrections of the radiated field is achieved without interfering in any way with the operation of the Navaglobe system.

Turning first to Fig. 1, a radio beacon transmitter is represented comprising antennas 1, 2 and 3 (which together with their radiated signals will be referred to hereinafter as A, B and C, respectively) powered by transmitters 4, 5 and 6, respectively, which are controlled by signals from carrier frequency generator 7 through switching and control circuit 8 which is in turn controlled by signals from a waveform generator 9. The signals from the waveform generator, shown in Fig. 3, are such that they cause the antennas to be energized cyclically in the order A and B, then B and C, then C and A producing radiation field patterns represented by lines 10, 11 and 12, respectively. In the Navaglobe system of the present invention this cyclical operation is continuous except for the synchronizing signal so that the pattern is continually rotated without any other interruptions. For the purpose of monitoring radiation from the antennas, a receiver antenna 13 is located equidistant from the three radiating antennas A, B and C. The signal detected by receiver antenna 13 and amplified by monitor receiver 14 is a function of the vector sum of radiation from the antennas which compose each pair and is applied to the switching and control circuit 8 for comparison with a reference signal. The switching and control circuit 8 serves to feed phase and amplitude adjusted signals to the linear transmitters for antennas A, B and C. By the above means, the power antennas 1, 2 and 3 is adjusted so that radiation from each of antennas B and C at the monitor antenna 13 is in phase and amplitude equality with radiation from antenna A.

Turning now to Fig. 2, there is shown a schematic block diagram of switching and control circuit 8 of Fig. 1. Carrier frequency generator 7, waveform generator 9 and monitor receiver 14 feed signals to the switching circuit as shown also in Fig. 1. Waveforms $a$, $b$ and $c$ (Fig. 3) are fed to relay drivers 15, 16 and 17 to control and energize relays 18, 19 and 20, which feed the carrier frequency signal to transmitters 4, 5 and 6, respectively. Transmitters 4, 5 and 6 power antennas A, B and C, respectively. The pulses in waveforms $a$, $b$ and $c$, shown in Fig. 3, are such that antennas A, B and C are caused to be energized sequentially in pairs A and B, then B and C, then C and A. The pulses in the waveforms are continually repeated so that the sequential radiation in pairs is continually and uninterruptedly repeated during operation of the beacon. Radiation from each pair of antennas is sensed by monitor antenna 13 and fed via monitor receiver 14 to a phase and amplitude error detector 23 which compares the monitored signal with a reference signal derived from carrier frequency generator 7 and produces phase and amplitude difference signals at output lines 23$a$ and 23$b$, respectively.

The phase and amplitude difference signals from the error detector 23 are applied to relay switches 24, 25 and 26 which switches are energized by relay drivers 27, 28 and 29, respectively. These relay drivers, 27, 28 and 29 receive waveforms $b'$, $c'$ and $r'$, respectively. Waveforms $b'$, $c'$ and $r'$, shown in Fig. 3, contain pulses which are timed to cause relay switches 24, 25 and 26 to be energized at appropriate times so that the phase error and amplitude error signals from error detector 23 are applied to phase control servo 30 or 31 or 32 and amplitude control servo 33 or 34 or 35 to bring phase and amplitude of the signals detected at monitor antenna 13 and the reference signal derived from carrier frequency generator 7, which are compared in error detector 23 into phase and amplitude agreement. Thus, it is seen that the pulses in the waveforms from waveform generator 9 cause a series of relays to operate applying phase and amplitude error signals to phase and amplitude control servos which in turn adjust radiation from antennas B or C or the reference signal so that phase error and the amplitude error from error detector 23 are nulled.

Referring now to Fig. 3, there is shown a set of waveforms that can be used in a system such as shown in Fig. 2, to make it operative in bringing the radiation from the antennas A, B and C as detected at a central point by monitor antenna 13, into equality. Examination of waveforms $a$, $b$ and $c$ which cause antennas A, B and C, respectively, to radiate, make it apparent that the antennas will radiate sequentially in pairs, the sequence being A and B, then B and C, than C and A. Examination of waveforms $b'$, $c'$ and $r'$ make it apparent that they will cause relays 24, 25 and 26 of Fig. 2 to be energized applying phase and amplitude correction to the signals from carrier frequency generator 7 which controls linear transmitters 5, 6 and the reference signal as fed to error detector 23. Examination of the operation of the system shown in Fig. 2 as dictated by the waveforms in Fig. 3 over 1⅓ period, make it apparent that the phase and amplitude difference signals will be applied to phase and amplitude control servos for antennas B or C or the reference signal as subsequent pairs of antennas radiate, according to the following schedule representing one period:

When antennas A and B radiate, antenna B is corrected.
When antennas B and C radiate, antenna C is corrected.
When antennas C and A radiate, the reference derived from carrier frequency generator 7 is corrected.

It can be seen that repeating this sequence of corrections for 1⅓ period will bring the radiation from antennas B and C as detected by monitor antenna 13 into phase and amplitude equality with radiation from antenna A as detected by monitor antenna 13.

It can be readily understood that while the system described in this invention as applied to maintain phase and amplitude equality of radiation from the three antennas which form the beacon in the Navaglobe system, shows a simple application of the invention, the underlying principle would be the same if the invented system were applied to beacons composed of more than three antennas radiating in groups of two or more. Furthermore, many types of equipment may be used without departure from the invention as described herein. Other devices for switching signals and monitoring signals and detecting phase and amplitude differences could be used to achieve the same effect. The various units indicated by blocks in the diagrams have not been shown in detail since many forms of equipment to perform each of their functions are already known to those skilled in the art. For example, the phase and amplitude error detector 23, employed in conjunction with phase, 30–32, and amplitude, 33–35, control servos may be the same as those described in the above referred to patent of Dishal et al. for "Control System for Converting Phase and Amplitude."

While there are described above the principles of the invention in connection with specific apparatus, it is to be clearly understood that this description is made only by way of example and not as a limitation to the scope of the invention as set forth in the objects thereof and in the accompanying claims.

I claim:

1. A system for bringing a plurality of electrical signals into phase and amplitude agreement comprising a plurality of sources of electrical signals, means for detecting the vector sums of each of different groups of said electrical signals with each group having at least two signals therein and with each signal appearing in at least one group, a reference signal source, means coupled to said reference signal source and said vector sum detector for comparing each of the detected vector sums with the reference signal and producing a resultant error signal, and means for applying the error signal from each comparison to at least one of the sources whose signals enter into that comparison to bring each of said vector sums and said reference signal into agreement.

2. A system for bringing a plurality of electrical signals into phase and amplitude agreement comprising a plurality of sources of electrical signals, means for detecting the vector sums of each of a plurality of pairs of said electrical signals, a reference signal source, means coupled to said reference signal source and said vector sum detector for comparing each of the detected vector sums with the reference signal and producing a resultant error signal, and means for applying the error signal in each comparison to at least one of the sources whose signals enter into that comparison to bring each of said vector sums and said reference signal into agreement, said applying means including means for switching the error signals to different ones of said sources in successive comparisons until all are brought into agreement.

3. A system for bringing N electrical signals into phase and amplitude agreement comprising a plurality of sources of electrical signals, means for detecting the vector sums of each of $n$ signals in a group, where N and $n$ are relatively prime, each group containing the same number of signals and the signals in successive groups varying in cyclically permutative order, a reference signal source, means coupled to said reference signal source and said vector sum detector for comparing each of the detected vector sums with the reference signal and producing a resultant error signal, and means for applying the error signal from each comparison to at least one of the sources whose signals enter into that comparison to bring each of said vector sums and said reference signal into agreement, said applying means including means for switching the error signals to control different ones of said sources in successive comparisons until all are brought into agreement.

4. A system for bringing the signals radiated from each of a plurality of antennas into equality of a given point comprising a plurality of antennas, a plurality of signal sources, means coupled to said sources for energizing said antennas cyclically in groups, each group comprising a number of antennas less than the total number and relatively prime with respect to said total, means at the given point for detecting the combined signals from each of said groups of energized antennas, a reference signal source, means coupled to said reference signal source and said detecting means for comparing the signals detected from each group of antennas with the reference signal and producing a resultant error signal, and means for applying the error signal from each comparison to different ones of the signal sources to bring the detected radiation and said reference signal into agreement.

5. A system according to claim 4, wherein said applying means includes means for switching the error signal to control radiation from the different antennas to the different sources energizing said antennas and to the reference signal source.

6. A system for bringing the signals radiated from each of a plurality of antennas into equality at a given point comprising a plurality of antennas, a plurality of signal sources, one of said sources being a reference signal source, means coupled to all of said signal sources except said reference signal source for energizing said antennas cyclically in groups, each group comprising a number of antennas less than the total number of antennas and relatively prime with respect to said total, means for detecting the signals from each of said groups of energized antennas at the given point, means coupled to said reference signal source and said detecting means for comparing the signals detected from each group of antennas with the reference signal and producing a resultant error signal, and means for applying the error signal from each comparison to said signal sources to bring the detected radiation and said reference signal into agreement, said applying means including means for switching the error signal to different signal sources to vary the relative phase and amplitude between the detected signal and the reference signal until the radiation from each of the antennas to the given point are brought into agreement.

7. A beacon comprising a plurality of antennas, a plurality of signal sources, one of said sources being a reference signal source, means coupled to all of said sources except said reference signal source for energizing said antennas in cycles in groups, the signals in each group varying in cyclically permutative order, each group comprising a number of antennas less than the total number of antennas and relatively prime with respect to said total number, means for detecting the signals from each of said groups of energized antennas at a given point, means coupled to said reference signal source and said detecting means for comparing the signals detected from each group of antennas with the reference signal and responsive to said comparisons to correct the signals from said signal sources to bring the signal radiated from each of said antennas into equality at said given point.

8. A Navaglobe beacon comprising three antennas located at the corners of an equilateral triangle, means including a signal energy source for energizing said antennas in cycles in groups of two so as to effectively produce a directional radiation pattern having stepped rotation, means including a monitoring antenna located at a point equidistant from each of the first-mentioned plurality of antennas for detecting the signals from each of said pairs of energized antennnas at said point, a reference signal source, means coupled to said reference signal source and said detecting means for comparing the signals detected from each pair of antennas with the reference signal and responsive to said comparisons to correct the signals emitted by each of said antennas and the reference signal to bring them into phase and amplitude equality at said point.

References Cited in the file of this patent

UNITED STATES PATENTS

| | | |
|---|---|---|
| Re. 23,050 | Brunner | Nov. 23, 1948 |
| 2,085,424 | Goddard | June 29, 1937 |
| 2,449,174 | O'Brien | Sept. 14, 1948 |
| 2,651,032 | Torcheux | Sept. 1, 1953 |